(12) United States Patent
Furukawa et al.

(10) Patent No.: US 8,707,057 B2
(45) Date of Patent: Apr. 22, 2014

(54) DATA PROCESSING APPARATUS AND DATA PROCESSING METHOD

(75) Inventors: Kazuyoshi Furukawa, Kawasaki (JP); Takeshi Shimoyama, Kawasaki (JP); Masahiko Takenaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/237,317

(22) Filed: Sep. 20, 2011

(65) Prior Publication Data

US 2012/0008782 A1    Jan. 12, 2012

Related U.S. Application Data

(63) Continuation of application No. PCT/JP2009/001276, filed on Mar. 23, 2009.

(51) Int. Cl.
  *G06F 11/30* (2006.01)
  *G06F 12/14* (2006.01)

(52) U.S. Cl.
  USPC ........................................... 713/193; 380/268

(58) Field of Classification Search
  USPC .................. 380/3, 42, 268; 713/189, 193
  See application file for complete search history.

(56) References Cited

U.S. PATENT DOCUMENTS

| | | | | |
|---|---|---|---|---|
| 6,061,449 | A * | 5/2000 | Candelore et al. | 380/28 |
| 2002/0053039 | A1* | 5/2002 | Inoue et al. | 713/323 |
| 2002/0112193 | A1* | 8/2002 | Altman et al. | 713/323 |
| 2002/0146019 | A1 | 10/2002 | Malzahn | |
| 2006/0147040 | A1* | 7/2006 | Lee et al. | 380/28 |
| 2007/0286413 | A1 | 12/2007 | Derouet | |
| 2008/0168279 | A1 | 7/2008 | Kanai | |
| 2010/0091991 | A1 | 4/2010 | Shibutani et al. | |

FOREIGN PATENT DOCUMENTS

| | | |
|---|---|---|
| CN | 1236132 A | 11/1999 |
| CN | 101086769 A | 12/2007 |
| EP | 1 093 056 A1 | 4/2001 |
| JP | 09-258655 A | 10/1997 |
| JP | 2000-076144 A | 3/2000 |
| JP | 2001-109667 A | 4/2001 |
| JP | 2002-091828 A | 3/2002 |
| JP | 2O02-328844 A | 11/2002 |

(Continued)

OTHER PUBLICATIONS

Chinese Office Action dated Jun. 26, 2013, 24 pages.

(Continued)

*Primary Examiner* — Kambiz Zand
*Assistant Examiner* — Jing Sims
(74) *Attorney, Agent, or Firm* — Arent Fox LLP

(57) ABSTRACT

A data processing apparatus includes an address bus, a scramble unit, and a data bus. The address bus outputs address data to be given to a memory apparatus. The scramble unit scrambles write-in data into a storage position in the memory apparatus identified by the address data to obtain confidential data. The data bus outputs the confidential data. The scramble unit includes a first scrambler, a first converter and a second scrambler. The first scrambler XORs first mask data corresponding to the address data and the write-in data for each bit and makes it first scrambled data. The first converter performs one-to-one substitution conversion of the first scrambled data. The second scrambler XORs second mask data corresponding to the address data and data after the conversion of the first scrambled data by the first converter and outputs obtained second scrambled data as the confidential data.

14 Claims, 10 Drawing Sheets

(56) References Cited

FOREIGN PATENT DOCUMENTS

| | | |
|---|---|---|
| JP | 2003-087240 A | 3/2003 |
| JP | 2004-110408 A | 4/2004 |
| JP | 2006-277411 A | 10/2006 |
| JP | 2007-328789 A | 12/2007 |
| JP | 2008-58829 A | 3/2008 |

OTHER PUBLICATIONS

Japanese Office Action dated May 14, 2013, 10 pages.

* cited by examiner

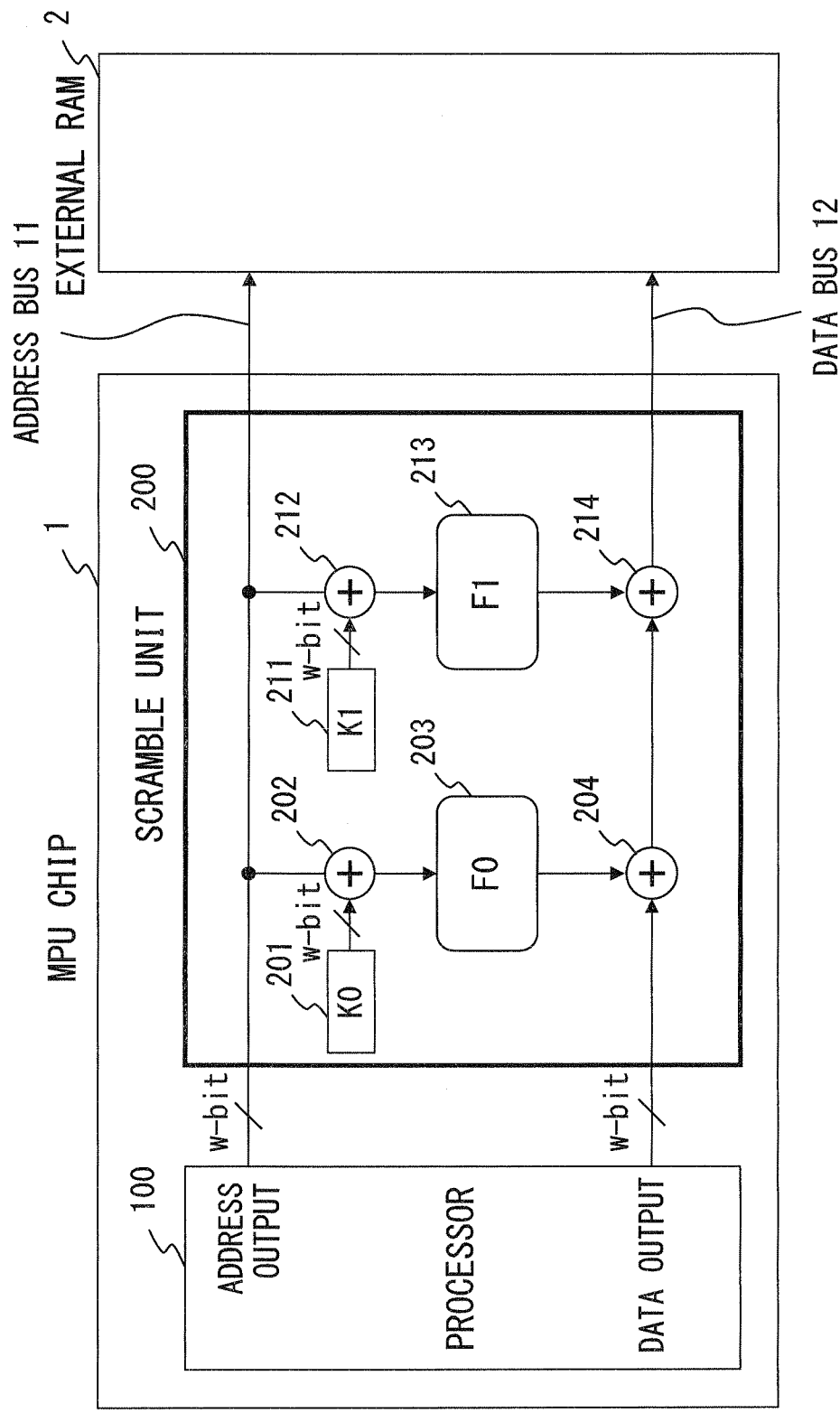
F I G. 3

FIG. 6A

| | G1 | | | | | | | | | | | | | | | | G1⁻¹ | | | | | | | | | | | | | | | |
|---|---|---|---|---|---|---|---|---|---|---|---|---|---|---|---|---|---|---|---|---|---|---|---|---|---|---|---|---|---|---|---|---|
| INPUT | 0 | 1 | 2 | 3 | 4 | 5 | 6 | 7 | 8 | 9 | a | b | c | d | e | f | 0 | 1 | 2 | 3 | 4 | 5 | 6 | 7 | 8 | 9 | a | b | c | d | e | f |
| OUTPUT | 1 | 3 | 2 | 7 | b | 5 | a | c | 0 | 9 | 6 | d | e | 4 | f | 8 | 8 | 0 | 2 | 1 | d | 5 | a | 3 | f | 9 | 6 | 4 | 7 | b | c | e |

| | G1 | | | | | | | | | | | | | | | | G1⁻¹ | | | | | | | | | | | | | | |
|---|---|---|---|---|---|---|---|---|---|---|---|---|---|---|---|---|---|---|---|---|---|---|---|---|---|---|---|---|---|---|---|
| INPUT | 0 | 1 | 2 | 3 | 4 | 5 | 6 | 7 | 8 | 9 | a | b | c | d | e | f | 0 | 1 | 2 | 3 | 4 | 5 | 6 | 7 | 8 | 9 | a | b | c | d | e | f |
| OUTPUT | 3 | 4 | a | 0 | 1 | 7 | 8 | 5 | 6 | d | 2 | b | c | 9 | e | f | f | 3 | 4 | a | 0 | 1 | 7 | 8 | 5 | 6 | d | 2 | b | c | 9 | e |

FIG. 6B

DATA PROCESSING APPARATUS AND DATA PROCESSING METHOD

CROSS-REFERENCE TO RELATED APPLICATION

This application is a continuation application based on International Application No. PCT/JP2009/001276, filed on Mar. 23, 2009, the entire contents of which are incorporated herein by reference.

FIELD

The embodiments discussed herein are related to a technique to protect data stored in a memory apparatus.

BACKGROUND

Since an embedded device such as a mobile phone has valuable asset such as paid contents, it has become a target of attacks to obtain it fraudulently. One way of such attacks is data probing. The data probing is an attack to read out data electrically from an exposed data bus wiring between an MPU (Micro Processor Unit) chip and an external RAM (Random Access Memory).

Data scrambling is a method of preventing information leaking due to the data probing. The data scrambling is to convert data into scrambled data before it is released from the MPU chip, to keep the contents of the data confidential from the attacker.

Here, FIG. 1 is explained. FIG. 1 illustrates an example of conventional data scrambling.

In FIG. 1, an MPU chip 1 being a data processing apparatus has an address bus 11 and a data bus 12 both having a bit width of w-bit and are respectively connected to an external RAM 2 being a memory apparatus. Furthermore, the MPU chip 1 has a processor 100 and a scramble unit 200 inside.

The address bus 11 outputs address data to give to the external RAM 2 output by the processor 100.

The scramble unit 200 obtains confidential data by scrambling write-in data, output by the processor 100, to the storage position of the external RAM 2 specified by an address data output by the address bus 11.

The data bus 12 outputs the confidential data that the scramble unit 200 has obtained.

The configuration of the scramble unit 200 presented in FIG. 1 is further explained.

The scramble unit 200 is configured to have a key register 201, an exclusive OR circuit (hereinafter, referred to as an "XOR circuit") 202, a substitution function processing unit 203, and an XOR circuit 204.

The key register 201 is a register in which scramble key data K of w-bit is stored.

The XOR circuit 202 XORs the same address data as that output by the address bus 11 and the scramble key data stored in the key register 201 for each bit.

The substitution function processing unit 203 performs a substitution conversion process to associate w-bit data output from the XOR circuit 202 uniquely with any data expressed in w-bit and to output the uniquely associated data.

The XOR circuit 204 XORs, during the scrambling operation, the write-in data output by the processor 100 and data (mask value) corresponding to the address data output from the substitution function process unit 203 for each bit. The data output from the XOR circuit 204 is the confidential data in which the write-in data is scrambled, which is output from the data bus 12 to the external RAM 2. The confidential data is stored in a storage position in the external RAM 2 specified by an address data output by the address bus 11.

When the MPU chip 1 reads out the confidential data from the external RAM 2, the scramble unit 200 performs a descrambling operation.

The address data being output from the address bus 11 when the MPU chip 1 reads out the confidential data from the external RAM 2 is the same as that when the confidential data is written in. Therefore, if the scramble key data K in the key register 201 and substitution conversion F in the substitution function processing unit 203 are both the same as those at the time of the scrambling operation, the mask value output from the substitution function processing unit 203 at the time of reading out of the confidential data becomes the same as that at the time of written in the confidential data.

The XOR circuit 204 XORs, during the descrambling operation, the confidential data read out from the eternal RAM 2 and the mask value output from the substitution function processing unit 203 for each bit. Here, since the mask value is the same at the time of writing in and reading out of the confidential data, the XOR results in the original write-in data. The descrambling of the confidential data is completed as described above, and the obtained original write-in data is read in the processor 100.

As described above, in the configuration presented in FIG. 1, the scramble unit 200 inside the MPU chip 1 performs scrambling of write-in data to the external RAM 2. That is, since the wiring for the processor 100 and the scrambling unit 200 is not exposed outside the MPU chip 1, write-in data cannot by read out by data probing before it is subjected to scrambling.

In addition, in the configuration presented in FIG. 1, generally, the processor 100 performing the data processing performs calculation of the mask value in advance using the characteristic that address data can be prepared in the address bus 11 before write-in data is prepared. By reducing processing for write-in data as much as possible as described above, the high-speed response performance to complete the scrambling process within the delay time that is allowed between the processor 100 and the external RAM 2.

Generally, in the scrambling of write-in data to the memory apparatus, safety can be improved by generating the mask value with the shared key block cipher and the like, and the safety is maintained even if the processing scheme is revealed. However, since the processing of the shared key block cipher is complicated generally, it becomes impossible when using the shared key block cipher to satisfy the high-speed response performance that is required for the data bus 12 transmitting the write-in data.

Meanwhile, the scrambling adopting the configuration presented in FIG. 1 ensures, by embedding the scramble unit 200 into the MPU chip 1, security with the difficulty for the attacker to know the algorithm for generating the mask value. The scrambling adopting this configuration has a feature that since the calculation volume is smaller than the case in which a cryptographic processing that is still safe even if the algorithm of the scrambling is revealed, the processing can be performed at a high speed.

In addition, the data scramble unit 200 in the configuration presented in FIG. 1 generates scramble data (confidential data) using both information write-in data and address data output from the processor 100. With the data scramble algorithm that is dependent also on the address data, even with for the same write-in data, the scrambled data written into the external RAM 2 becomes different by the address data, improving the resistance for analysis.

Meanwhile, as other backgrounds arts, a technique to perform scrambling of data also at the memory unit side and a technique of double encryption to further encrypt encrypted data have been known (e.g. Japanese Laid-open Patent Publication Nos. 2001-109667, 2002-328844 and 2004-110408).

By the way, as described earlier, by providing the scramble unit 200 within the MPU chip 1, it has become possible to make data confidential from data probing. However, there still remains the risk that the attacker analyses the scramble algorithm. In order to ensure the security of the scrambling, the security of the scramble algorithm needs to be evaluated.

One of items to evaluate the security of a keyed scramble algorithm being an algorithm to perform data scrambling using scramble key data as adopted in the scramble unit 200 in FIG. 1 is resistance to brute force key attacks based on a known plaintext attack.

In the brute force key attacks, among the combination of scramble key data, write-in data, scramble data and address data and hardware implementing the scramble key algorithm, those except for the scramble key data are given to the attacker. The attacker executes, in this case, scrambling while setting scramble key data arbitrarily. Then, the execution is repeated until the scramble key data used in the given combination is identified.

The resistance to the brute force key attack in creases as the key length of the scramble key data becomes longer. In addition, the security is ensured by making the calculation volume required for the brute force key attack a value that cannot be calculated within a practical period of time.

For the keyed scramble algorithm adopted in the scramble unit 200 in FIG. 1, the key length (bit length) of the scramble key data cannot be longer than the word length of the processor 100.

For example, the word length of the processor for a number of embedded devices is currently below 32 bits. Here, the brute force key attack to the scramble unit 200 in the case in which the word length is assumed as 32 bits is considered. Supposing that the execution of scrambling can be performed 1000 times per second, the scramble key data could be found in 50 days.

In addition, as an attacking method to a keyed scramble algorithm, chosen plaintext attacks have been known. In this attack, a case is assumed in which the attacker cannot see the scramble key data is not to be known by the attacker but can obtain scramble data while setting data and address data freely. In other words, this attack assumes a higher ability of the attacker than that for the brute force key attack.

In the scramble unit 200 in FIG. 1, the attacker first create a pair of write-in data and scrambled data for all address data. Then, the mask value for all the scrambled data can be found by XORing the scrambled data and write-in data. Then, it becomes possible for the attacker to descramble the scrambled data of a given address into data using the obtained mask value, without finding the scramble key data.

SUMMARY

According to an aspect of the embodiment, a data processing apparatus includes: an address bus configured to output address data to be given to a memory apparatus; a scramble unit configured to scramble write-in data into a storage position in the memory apparatus identified by the address data output by the address bus to obtain confidential data; and a data bus configured to output the confidential data obtained by the scramble unit, wherein the scramble unit includes: first scramble means configured to scramble the write-in data by XORing with first mask data corresponding to the address data for each bit to obtain first scrambled data; first conversion means configured to perform one-to-one substitution conversion of the first scrambled data; and second scramble means configured to scramble the first scrambled data after conversion by the first conversion means by XORing with second mask data corresponding to the address data for each bit to obtain second scrambled data, and the scramble unit makes the second scramble data the confidential data.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 3 is a diagram illustrating a first example of a scramble unit presented in FIG. 2.

FIG. 6A is a first example of a substitution function and its inverse function.

FIG. 6B is a second example of a substitution function and its inverse function.

DESCRIPTION OF EMBODIMENTS

Preferred embodiments of the present invention will be explained with reference to accompanying drawings.

Figure 2:
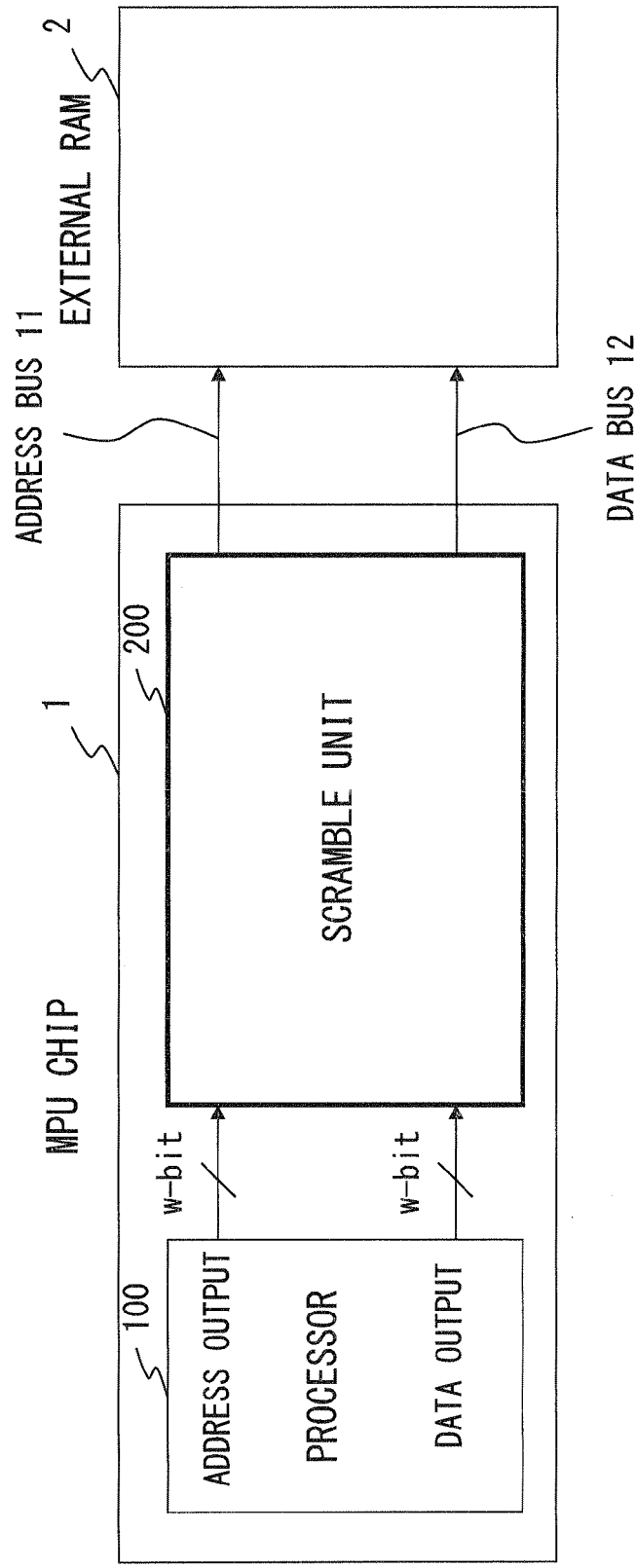
FIG. 2 is an overall configuration diagram of a data processing apparatus.

FIG. 2 illustrates the overall configuration of an MPU chip 1 being a data processing apparatus.

In FIG. 2, the MPU chip 1 has an address bus 11 and a data bus 12 whose bit width is both w-bit and being respectively connected to an external RAM 2 being a memory apparatus. Furthermore, the MPU chip 1 has a processor 100 and a scramble unit 200 inside.

The address bus 11 outputs address data output by the processor 100 and given to the external RAM 2.

The scramble unit 200 scrambles write-in data output by the processor 100 that is for the storage position in the external RAM 2 identified by address data output by the address bus 11 to obtain confidential data.

The data bus 12 outputs the confidential data obtained by the scramble unit 200.

The configuration unit 200 presented in FIG. 2 is further described. FIG. 3 illustrates the first example of the configuration of the scramble unit.

In FIG. 3, the scramble unit 200 is configured to have key registers 201 and 211, XOR circuits 202, 204, 212 and 214, and substitution function processing units 203 and 213.

The key register 201 is a register in which scramble key data K0 of w-bit is stored. The scramble key data K0 (hereinafter, the key data K0 may be referred to as "first scramble key data") to be stored in the register 201 is changeable.

The XOR circuit 202 XORs address data that is the same as the one output by the address bus 11 and the first scramble key data stored in the key register 201.

The substitution function processing unit 203 performs a substitution conversion process to associate w-bit output from the XOR circuit 202 uniquely with any of the data expressed by w-bit and to output the uniquely associated data. For substitution conversion F0 performed in the substitution function processing unit 203, relationship of input and output is generally nonlinear. Meanwhile, the substitution function processing unit 203 is configured by combining basic logic elements (AND circuit, OR circuit, NOT circuit etc.). However, if the processing speed allows, for example, the substitution conversion may be performed by referring to a table stored in a storage apparatus in which correspondence relationship of input and output has been determined in advance. Meanwhile, in the description below, the data corresponding to the address data being data output from the substitution function processing unit 203 is referred to the "first mask data".

The XOR circuit 204 XORs write-in data output by the processor 100 and the first mask data output from the substitution function processing unit 203 for each bit, to perform scrambling of the write-in data.

In the following description, the scrambling performed by the key register 201, the XOR circuits 202 and 204, and the substitution function processing unit 203 is referred to as "first scrambling". In addition, data obtained by the first scrambling is referred to as "first scrambled data".

The key register 211 is a register in which scramble key data K1 of w-bit is stored. The scramble key data K1 (in the following description, the key data K1 may be referred to as "second scramble key data") to be stored in the register 211 is also changeable.

The XOR circuit 212 XORs address data that is the same as the one output by the address bus 11 and the second scramble key data stored in the key register 211.

The substitution function processing unit 213 performs a substitution conversion process to associate w-bit data output from the XOR circuit 212 uniquely with any of the data expressed by w-bit and to output the uniquely associated data. For substitution conversion F1 performed in the substitution function processing unit 213, relationship of input and output is also generally nonlinear in the same manner as in the substitution conversion F0. The substitution function processing unit 213 is also configured by combining basic logic elements, and if the processing speed allows, for example, the substitution conversion may be performed by referring to a table stored in a storage apparatus in which correspondence relationship of input and output has been determined in advance. Meanwhile, in the description below, the data corresponding to the address data being data output from the substitution function processing unit 213 is referred to the "second mask data".

The XOR unit 214 XORs the first scrambled data obtained by the first scrambling and the second mask data output from the substitution function processing unit 213 for each bit, to perform scrambling of the first scrambled data.

In the following description, the scrambling performed by the key register 211, the XOR circuits 212 and 214, and the substitution function processing unit 213 is referred to as "second scrambling". In addition, data obtained by the second scrambling is referred to as "second scrambled data".

In the configuration in FIG. 3, the second scrambled data obtained by the second scrambling is the confidential data in which write-in data output by the processor 100 is scrambled, which is output from the data bus 12 to the external RAM 2.

The confidential data is stored in the storage position in the external RAM 2 identified by an address data output by the address bus 11.

Figure 1:
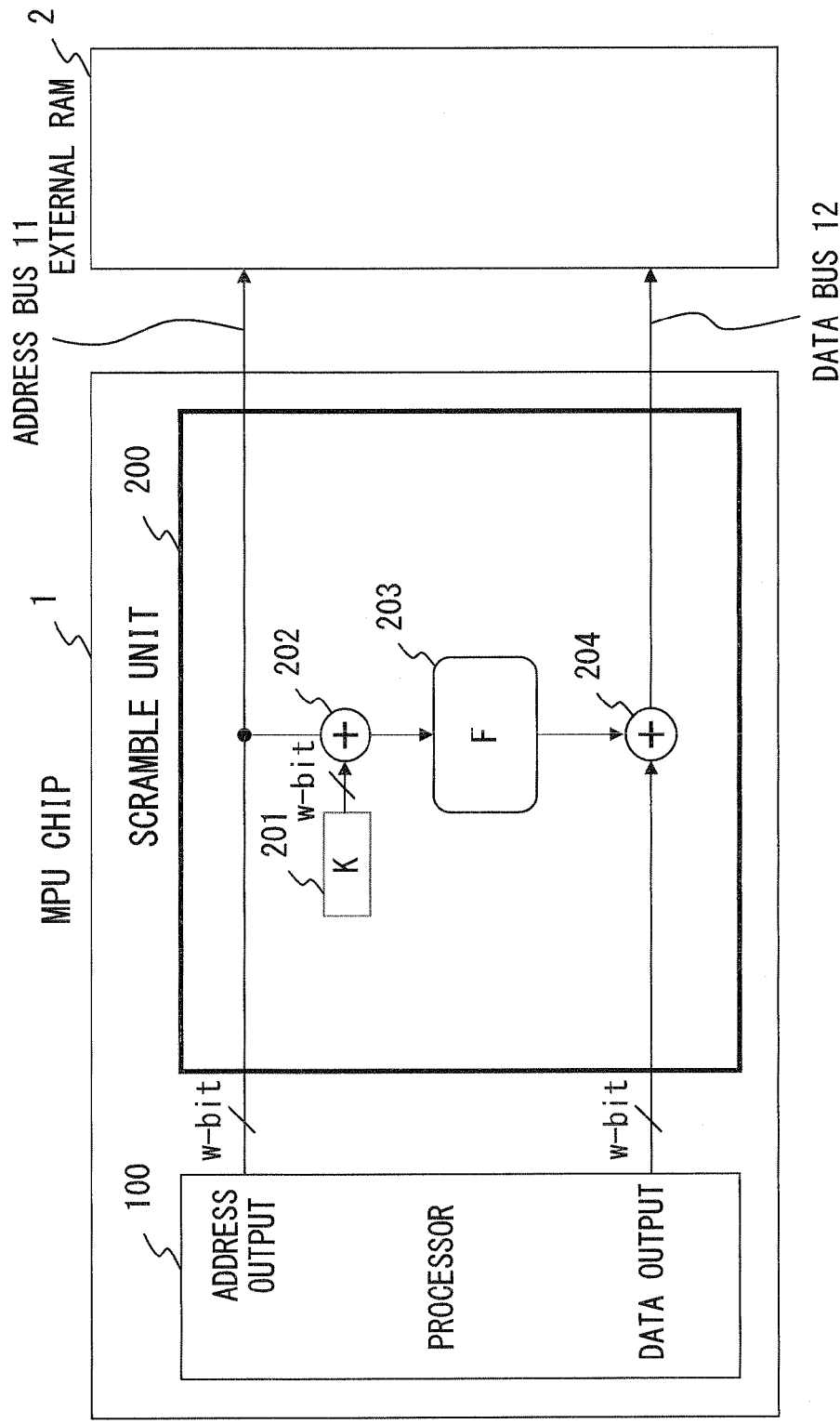
FIG. 1 is a diagram illustrating an example of conventional data scrambling.

As described above, the configuration of the scramble unit 200 presented in FIG. 3 is the one in which the conventional configuration presented in FIG. 1 is connected in tandem in two stages. Therefore, in order to obtain the original data by descrambling the confidential data obtained by the configuration, the descrambling in the conventional configuration presented in FIG. 1 may be performed in inverse order as in FIG. 3.

In the configuration in FIG. 3, the scrambling of write-in data is performed using the first scramble key data and the second scramble key data both having a key length of w-bit. Therefore, in the scramble unit 200 as a whole, the key length of the scramble key data used for the scrambling of write-in data seemingly becomes double (2 w-bit), but since the configuration of FIG. 3 can be converted into the configuration in FIG. 1 that is equivalent to it, the security is unchanged from FIG. 1.

Figure 4:
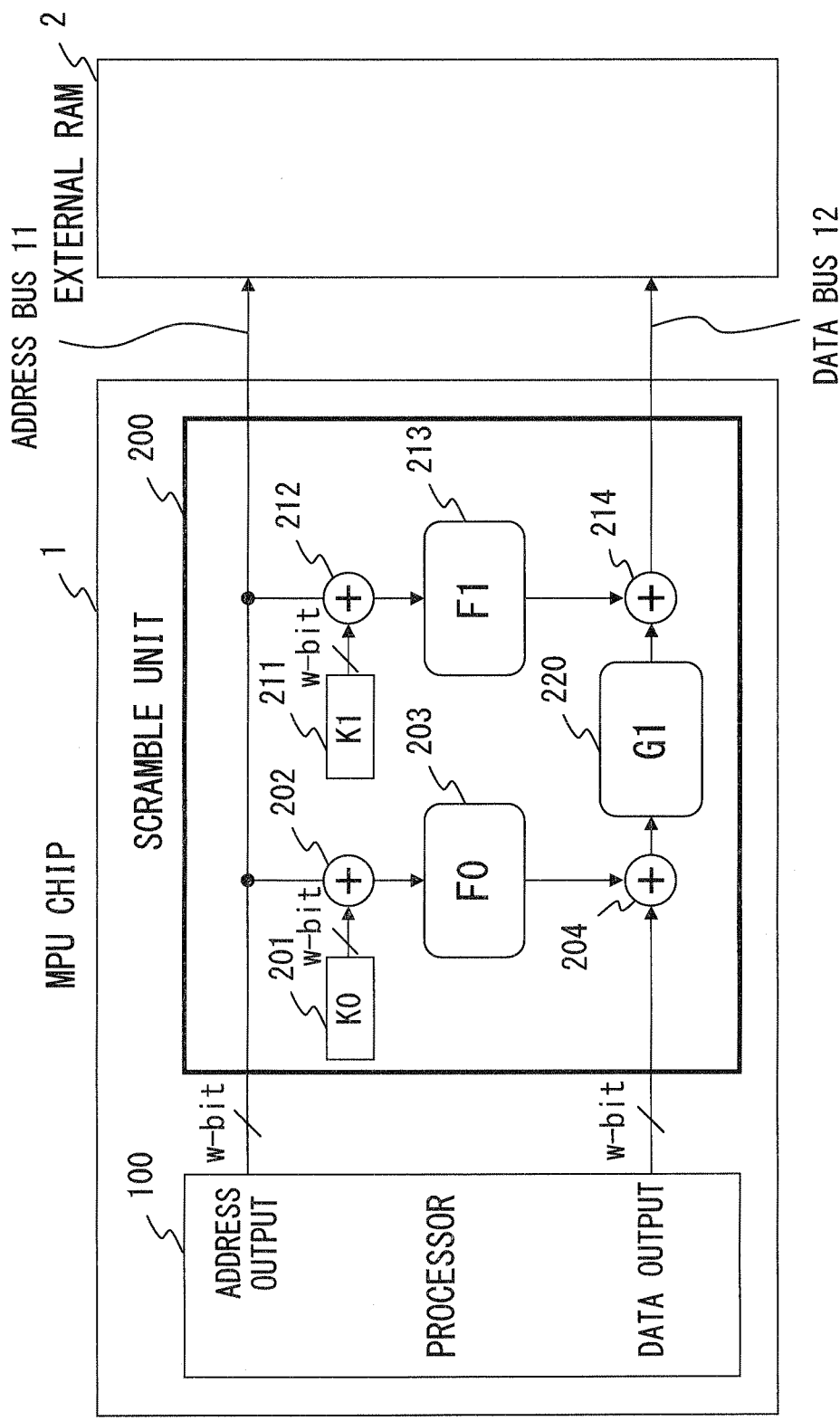
FIG. 4 is a diagram illustrating a first example of a scramble unit presented in FIG. 2.

Next, FIG. 4 is described. FIG. 4 illustrates the second example of the configuration of scramble unit 200 presented in FIG. 2.

In FIG. 4, the same numerals are assigned to the same constituent elements as those presented in FIG. 3. The description is partly omitted for these constituent elements.

The configuration presented in FIG. 4 differs from the first example of the configuration presented in FIG. 3 in that a substitution function processing unit 220 that performs one-to-one substitution conversion of the first scrambled data obtained by the first scrambling is added. In addition, in the second scrambling in the configuration presented in FIG. 4, the XOR circuit 214 XORs data after conversion of the first scrambled data by the substitution function processing unit 220 and the second mask data for each bit to obtained the second scrambled data. Then, the second scrambled data becomes the confidential data in which write-in data output by the processor 100 is scrambled.

The substitution function processing unit 220 performs a substitution conversion process to associate first scrambled data of w-bit with any of the data expressed by w-bit one-to-one and to output the one-to-one associated data. For substitution conversion G performed in the substitution function processing unit 220, relationship of input and output is also generally nonlinear in the same manner as in the substitution conversion F0 and F1. The substitution function processing unit 220 is also configured by combining basic logic elements, and if the processing speed allows, for example, the substitution conversion may be performed by referring to a table stored in a storage apparatus in which correspondence relationship of input and output has been determined in advance. However, since the substitution conversion processing unit 220 performs substitution conversion of data to be written into the external RAM 2, it is preferable that the conversion process is performed at a high speed.

In the configuration presented in FIG. 4, after the substitution function processing unit 220 performs substitution conversion of write-in data scrambled by the first scramble (that is, the first scrambled data), the second scrambling further performs scrambling. By doing so, the processing for write-in data being simple XOR with the mask value is avoided. In other words, according to the configuration presented in FIG. 4, the relationship between write-in data and confidential data in input/output of the scramble unit 200 depends not only on the address data but also on the write-in data. Therefore, the data scrambling performed by the scramble unit 200 having the configuration presented in FIG. 4 has resistance to chosen plaintext attacks. In addition, since the input/output of the substitution function processing unit 220 does is not exposed outside of the scramble unit, attacks to the substitution function processing unit 220 are prevented. That is, if the substitution function processing unit 220 is placed to the left of 204 or right of 214, the configuration becomes vulnerable to simple differential attacks to the substitution function processing unit 220. Therefore, in the configuration presented in FIG. 4, it is necessary that the substitution function processing unit 220 is placed between 204 and 214.

Furthermore, in the configuration presented in FIG. 4, in the scramble unit 200 as a whole, the key length of the scramble key data used for the scrambling of write-in data is doubled (2 w-bit). Therefore, resistance to brute force key attacks is improved compared to the conventional configuration in FIG. 1.

Figure 5:
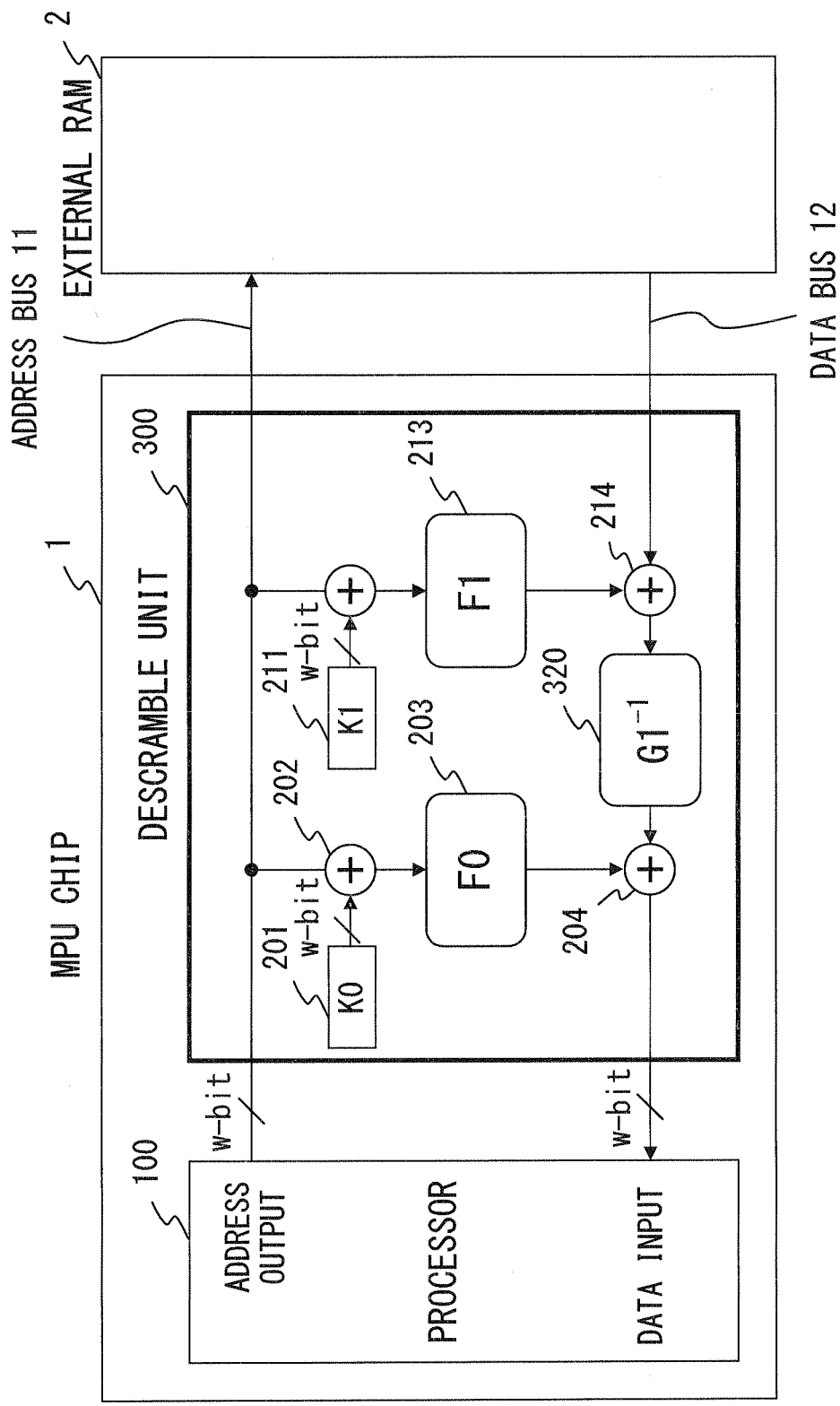
FIG. 5 is a configuration diagram of a descramble unit.

Next, descrambling of confidential data stored in the external RAM 2 by the MPU chip 1 having the scramble unit 200 configured as presented in FIG. 4 is described. FIG. 5 is a configuration diagram of a descramble unit that descrambles the confidential data.

In the configuration in FIG. 5, a descramble unit 300 is provided within the MPU chip 1 in FIG. 2 being a data processing apparatus. Instead of configuring in such a way, it is of course possible to provide the descramble unit 300 in a descramble unit being a separate body from the MPU chip 1.

In FIG. 5, the same numerals are assigned to the same constituent elements as those presented in FIG. 4. The description is partly omitted for these constituent elements.

The descramble unit 300 presented in FIG. 5 is configured to have the key registers 201 and 211, the XOR circuits 202, 204, 212 and 214, and the substitution function processing units 203, 213 and 320. Meanwhile, the address bus 11 outputs an address data output by the processor 100 and given to the external RAM 2 in the same manner as that presented in FIG. 4.

The XOR circuit 214 descrambles confidential data read out from the storage position of the external RAM 2 identified by an address data (that is, the second scrambled data described earlier) by XORing it with the second mask data described earlier for each bit. Then, the first scrambled data after the conversion by the substitution function processing unit 220 described earlier is obtained. Here, the descrambling is referred to as "first descrambling", and data obtained by the first descrambling is referred to as "intermediate descrambled data".

The substitution function processing unit 320 performs inverse conversion $G^{-1}$ of the substitution conversion G by the substitution function processing unit 220 for the intermediate descrambled data obtained by the XOR circuit 214.

Here, FIG. 6A is described. FIG. 6A is the first example of substitution conversion G and its inverse conversion $G^{-1}$. Meanwhile, the example of the substitution function G in FIG. 6A is for the word length of input/output of 4-bit (16 values of "0" ('0000' in binary digits)–"f" ('1111' in binary digits)).

According to FIG. 6A, it is expressed that when "8" for example is input in the substitution function G, "0" is output. Meanwhile, it is expressed that "0" being the output of the substitution function G is input to the inverse conversion $G^{-1}$, "8" that was the input to the substitution function G is output. In FIG. 6A, it is obvious that the relationship between the input of the substitution function G and its inverse conversion $G^{-1}$ is established for all the values of "0"-"f". In addition, it is also obvious that the input/output relationship of the substitution function G is one-to-one correspondence.

Meanwhile, the substitution function processing unit 320 is also configured by combining basic logic elements. Here, if the processing speed allows, for example, the substitution conversion may be performed by referring to a table stored in a storage apparatus in which correspondence relationship of input and output has been determined in advance. However, since the substitution conversion processing unit 320 performs substitution conversion of data to be written into the external RAM 2, also in the same manner as the substitution function processing unit 220, it is preferable that the conversion process is performed at a high speed.

The description returns to FIG. 5.

The XOR circuit 204 descrambles data after the inverse conversion of the intermediate descrambled data by the substitution function processing unit 320 by XORing it and the first mask data described earlier. Then, the original write-in data that was output by the processor 100 at the time of scrambling operation by the scramble unit 200 is obtained. Here, the descrambling is referred to as "second descrambling".

The descrambling operation by the descramble unit 300 whose configuration is presented in FIG. 5 is performed as described above.

Here, the configuration of the scramble unit 200 in FIG. 4 and the configuration of the descramble unit 300 in FIG. 5 are compared. Then, the XOR circuit 204 XORs input data (write-in data in the scramble unit 200 and data after the inverse conversion of the intermediate descrambled data in the descramble unit 300) and the first mask data described earlier in both configurations. Therefore, the XOR circuit 204 may be shared to the first scrambling in the scramble unit 200 and the second descrambling by the descramble unit 300. In addition, the XOR circuit 214 XORs input data (first scrambled data in the scramble unit 200 and confidential data read out from the external RAM 2 for the descramble unit 300) in both configurations. Therefore, the XOR circuit 204 may be shared for the second scrambling in the scramble unit 200 and the first descrambling in the descramble unit 300. By sharing the XOR circuits 204 and 214 for the scrambling operations by the scramble unit 200 and the descramble operations by the descramble unit 300, the circuit scale of the MPU chip 1 may be reduced.

Furthermore, the configuration for obtaining the first mask data composed of the key register 201, the XOR circuit 202 and the substitution function processing unit 203 is the same for the scramble unit 200 and the descramble unit 200. In addition, the configuration for obtaining the second mask data composed of the key register 211, the XOR circuit 212 and the substitution function processing unit 213 is also the same for the scramble unit 200 and the descramble unit 300. Therefore, when the scramble unit 200 and the descramble unit 300 exist together within a single MPU chip 1, the key registers 201 and 211, the XOR circuits 202 and 212, and the substitution function processing unit 203 and 213 may be shared. The circuit scale of the MPU chip 1 may be reduced also by sharing these constituent elements for the scrambling operations by the scramble unit 200 and the descrambling operations by the descramble unit 300.

In addition, between the substitution function processing unit 220 and the substitution function processing unit 320, one-to-one substitution conversion of input data may be performed, and the one with the forward conversion of the substitution conversion and its inverse conversion being identical (referred to as "identical substitution conversion") may be shared.

Here, FIG. 6B is described. FIG. 6B is the second example of substitution conversion G and its inverse conversion $G^{-1}$.

Meanwhile, the example of the substitution function G in FIG. 6B is also for the word length of input/output of 4-bit (16 values of "0" ('0000' in binary digits)–"f" ('1111' in binary digits)).

According to FIG. 6B, it expressed that when "0" for example is input in the substitution function G, "3" is output. Meanwhile, it is expressed that "3" being the output of the substitution function G is input to the inverse conversion $G^{-1}$, "0" that was the input to the substitution function G is output. In FIG. 6B, it is obvious that the relationship between the input of the substitution function G and its inverse conversion $G^{-1}$ is established for all the values of "0"–"f". In addition, it is also obvious that the input/output relationship of the substitution function G is one-to-one correspondence.

Furthermore, in the example in FIG. 6B, it is also obvious that the correspondence relationship between input and output in the substitution function G is the same as the correspondence relationship in its inverse conversion $G^{-1}$. Therefore, for the substitution conversion in FIG. 6B, the forward conversion G and its inverse conversion $G^{-1}$ are identical.

By configuring a function processing unit that performs identical substitution conversion as described above, it may be shared between the substitution function processing unit 220 and the substitution function processing unit 320. In other words, by sharing the function processing unit that performs identical substitution conversion between the substitution function processing unit 220 in the scramble unit 200 and the substitution function processing unit 320 in the descramble unit 300, the circuit scale of the MPU chip 1 may be reduced.

Next, the security of scrambling by the scramble unit 200 presented in FIG. 4 is reviewed.

For example, a case in which the word length of the processor (that is, the bit widths of address data and write-in data) is 32-bit is considered. At this time, the first scramble key data and the second scramble key data may both be 32-bit. At this time the key length of the entire scramble key data is 64-bit. In this case, a brute force key attack to the keyed scramble algorithm described earlier would require 584,942,417 years supposing that the scrambling operation can be performed 1000 times per second. In addition, even if the scrambling operation can be performed 1,000,000,000 times per second, 584 years would be required. Therefore, it is very difficult to find the scramble key data within a practical period of time.

Meanwhile, for the processor 100, it is preferable that the access to the external RAM 2 is at a high speed. Therefore, it is preferable that the amount of time required for the scrambling operation by the scramble unit 200 and the descrambling operation by the descramble unit 300 is small. Here, the time may be reduced by configuring the substitution function processing units 203, 213, 220 and 320 that performs the substitution conversion or its inverse conversion as follows.

That is, when the word length is 32-bit, instead of configuring the substitution function processing units 203, 213, 220 and 320 simply as 32-bit substitution functions for example, they are replaced with the combination of a 32-bit replace function and eight 4-bit substitution functions. Generally, for the substitution function, the complexity of the configuration increases exponentially as the word length becomes longer, and the time required for conversion also becomes longer. Therefore, by replacing a substitution function with a long word length with a combination of a replace function with a very simple configuration and a short conversion time since only rearrangement of bits is to be performed, and a substitution function with a short word length, the time required for substitution conversion can be reduced. Meanwhile, the substitution function used as the replacement is not limited to the one with the 4-bit word length, and for example, two 6-bit substitution functions and four 5-bit substitution functions may be used, or four 8-bit substitution functions may be used.

Meanwhile, the substitution function processing units 203 and 213 do not need to be the ones that perform identical substitution conversion, and may be non-identical. A circuit that performs non-identical substitution conversion may perform processing faster than identical one.

Figure 7:
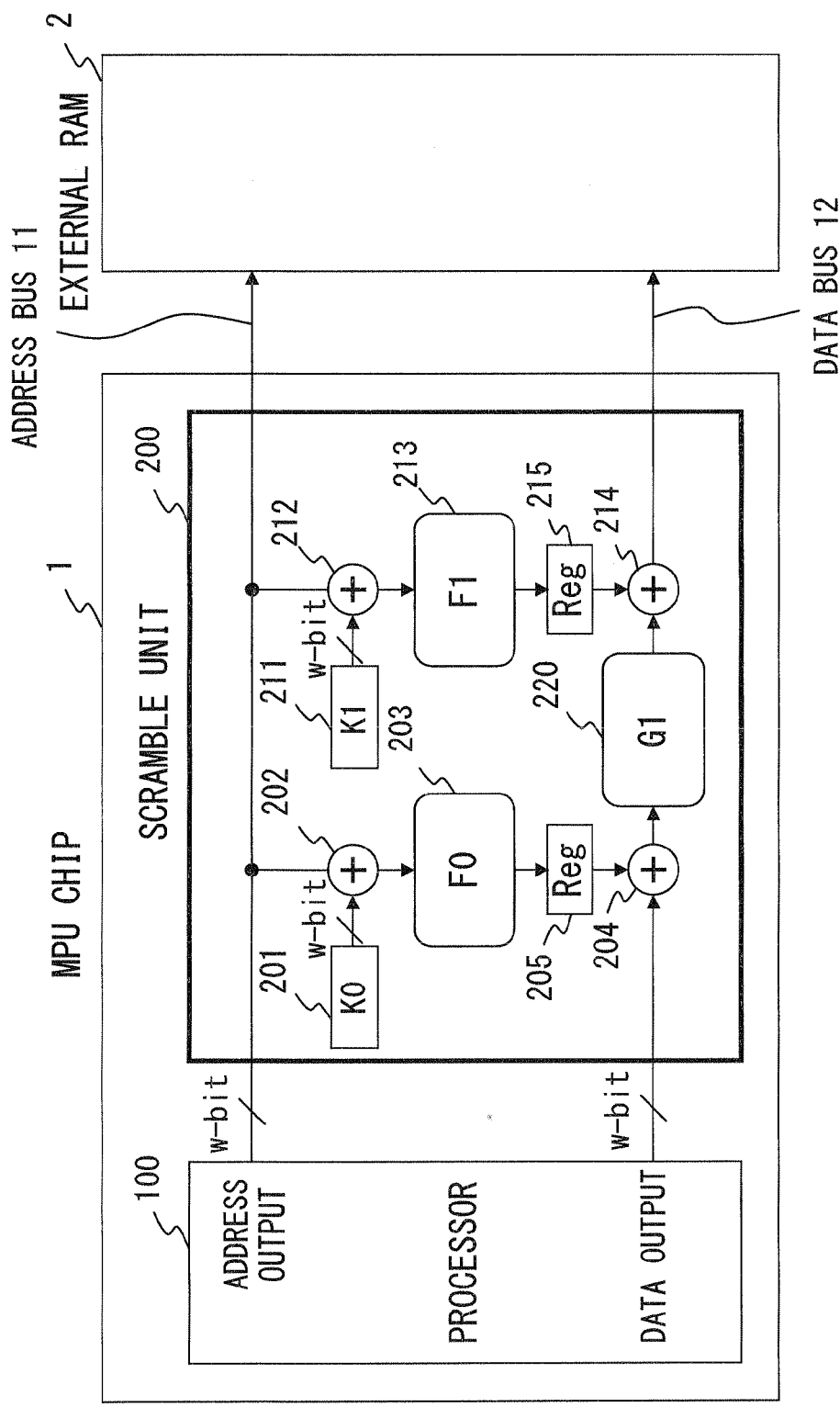
FIG. 7 is a diagram illustrating a third example of a scramble unit presented in FIG. 2.

Next, FIG. 7 is described. FIG. 7 illustrates the third example of the configuration of the scramble unit 200 presented in FIG. 2.

In FIG. 7, the same numerals are assigned to the same constituent elements as those presented in FIG. 4. The description is partly omitted for these constituent elements.

The configuration of the scramble unit 200 presented in FIG. 7 is preferable to make the scramble unit 200 performs a synchronized operation, and differs from the first example of the configuration presented in FIG. 3 that registers 205 and 215 are added.

In the register 205, the first mask data output from the substitution function processing unit 203 is stored and held. In addition, in the register 215, the second mask data output from the substitution function processing unit 213 is stored and held.

The configuration presented in FIG. 7 utilizes the general characteristic that the processor 100 performing the data processing can prepare address data in the address bus 11 before preparing write-in data.

That is, first, the XOR operations of the address data and the first scramble key data and the second scramble key data by the XOR circuits 202 and 204 and substitution conversion of the operation results by the substitution function processing units 203 and 213 are performed. Then, the first mask data and the second mask data obtained by the performance are stored in the registers 205 and 215 respectively. After that, when write-in data is output from the processor 100, the XOR operations by the XOR circuit 204, the substitution conversion of its operation result by the substitution function processing unit 220, and the XOR operation by the XOR circuit 214 are performed. Then, the confidential data obtained as the result of the performance is output to the RAM 2.

Meanwhile, descrambling of the confidential data obtained by the scrambling by the scramble unit 200 configured as presented in FIG. 7 may be performed, for example, using the descramble unit 300 configured as presented in FIG. 5.

Figure 8:
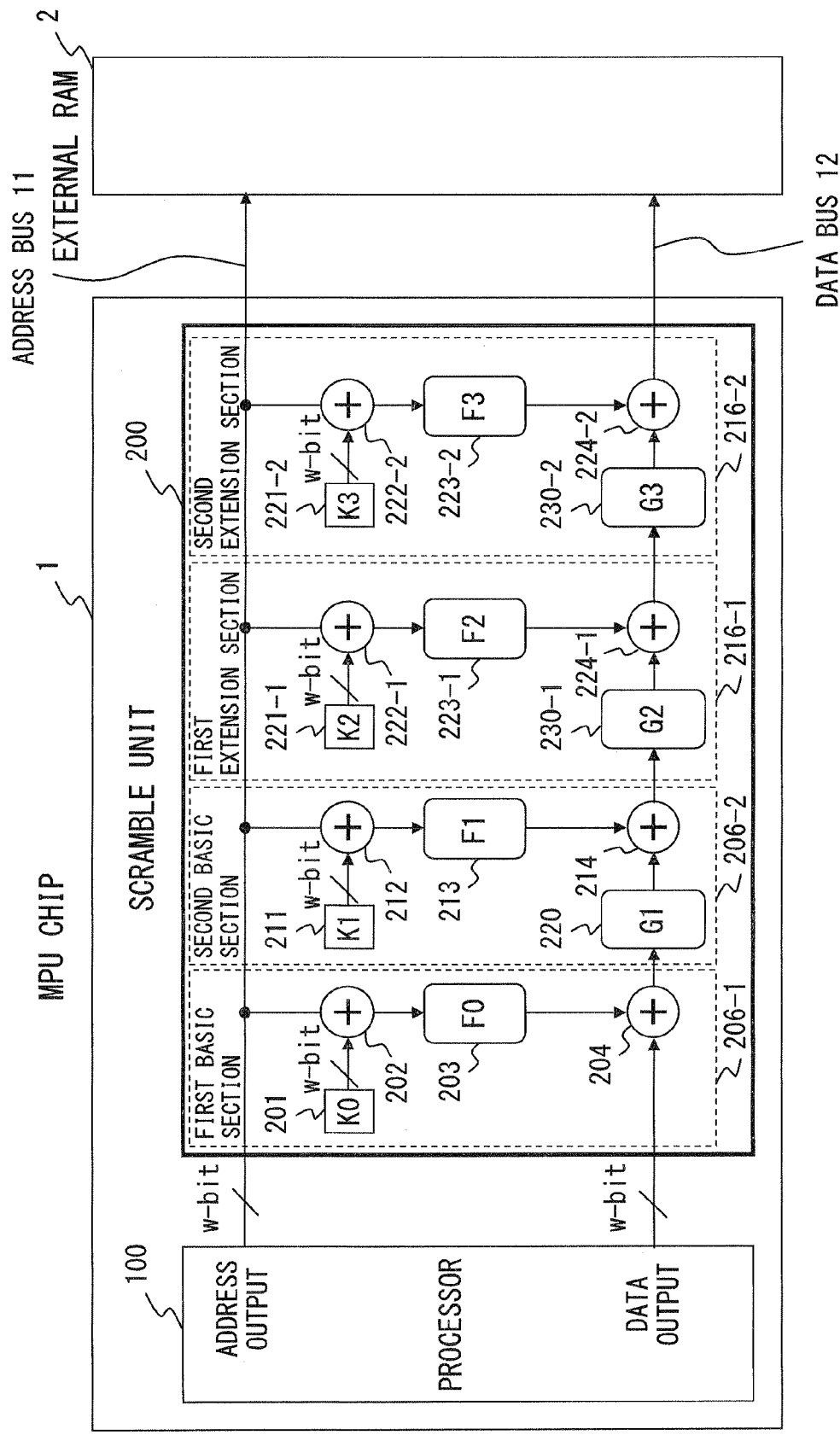
FIG. 8 is a diagram illustrating a fourth example of a scramble unit presented in FIG. 2.

Next, FIG. 8 is described. FIG. 8 illustrates the fourth example of the configuration of the scramble unit 200 presented in FIG. 2.

In FIG. 8, the same numerals are assigned to the same constituent elements as those presented in FIG. 4. The description is partly omitted for these constituent elements. Meanwhile, the configuration of the scramble unit 200 presented in FIG. 4, that is, the configuration composed of the key registers 201 and 211, the XOR circuits 202, 204, 212 and 214, and the substitution function processing units 203, 213 and 220 is referred as the basic section here. That is, in the configuration of the scramble unit 200 presented in FIG. 8, the configuration composed of the key register 201, the XOR circuits 202 and 204, and the substitution function processing unit 203 is referred to as a first basic section 206-1. Meanwhile, in FIG. 8, the configuration composed of the key register 211, the XOR circuits 212 and 214, and the substitution function processing units 213 and 220 is referred to as a second basic section 206-2.

Meanwhile, in FIG. 8, the configuration composed of the key register 221-1, the XOR circuits 222-1 and 224-1, and the substitution function processing unit 223-1 and 230-1 is referred to a first extension section 216-1. Then, in FIG. 8, the same configuration as the first extension section 216-1 composed of the key register 221-2, XOR circuit 222-2 and 224-2, and the substitution function processing units 223-2 and 230-2 is referred to as a second extension section 216-2.

That is, the scramble unit 200 presented in FIG. 8 is configured to have the first basic section 206-1 and the second basic section 206-2, and the first extension section 216-1 and the second extension section 216-2 that both scramble target data and output scrambled data.

Here, to the second basic section 206-2, data obtained by the first scrambling described earlier performed by the first basic section 206-1 (that is, the first scrambled data) is input as the target data. Then, the second basic section 206-2 performs the second scrambling described earlier, and outputs the second scrambled data.

To the first extension section 216-1, as the target data, data output by the second basic section 206-2 (second scrambled data) is input. In the first extension section 216-1, the substitution function processing unit 230-1 performs one-to-one substitution conversion of the target data, and the key register 221-1, the XOR circuit 222-1, and the substitution function processing unit 223-1 generates mask data corresponding to the address data. Then, the XOR circuit 229-1 XORs the data after the substitution conversion by the substitution function processing unit 230-1 and the mask data for each bit. The first extension section 216-1 performs the further scrambling of the scrambled data output by the second basic section 206-2 as described above.

To the second extension section 216-2, as the target data, the scrambled data output by the first extension section 216-1 is input. In the second extension section 216-2, the substitution function processing unit 230-2 performs one-to-one substitution conversion of the target data, and the key register 221-2, the XOR circuit 222-2, and the substitution function processing unit 223-2 generates mask data corresponding to the address data. Then, the XOR circuit 224-2 XORs the data after the substitution conversion by the substitution function processing unit 230-2 and the mask data for each bit. The second extension section 216-2 performs the further scrambling of the scrambled data output by the first extension section 216-1 as described above.

The scramble unit 200 presented in FIG. 8 outputs the scrambled data output by the second extension section 216-2 from the data but 12 to the external RAM 2 as confidential data.

As descried above, the configuration of the scramble unit 200 presented in FIG. 8 is the one in which, in the second configuration presented in FIG. 4, the extension sections following the basic sections are connected in tandem in two stages. Therefore, in order to obtain original data by descrambling confidential data obtained by the configuration, descrambling for the extension section may be performed in inverse order twice, and descrambling for the basic section may be performed after that.

In the scramble unit 200 presented in FIG. 8, scrambling of write-in data is performed using four pieces of scramble key data stored in the four key registers 201 and 211, and 221-1 and 221-2. Therefore, in the scramble unit 200 as a whole, the key length of the scramble key data used for scrambling of write-in data becomes quadruple (4 w-bit). Therefore, by adopting the configuration in FIG. 8, the resistance to the brute force key attack further improves compared with the configuration in FIG. 4.

Figure 9:
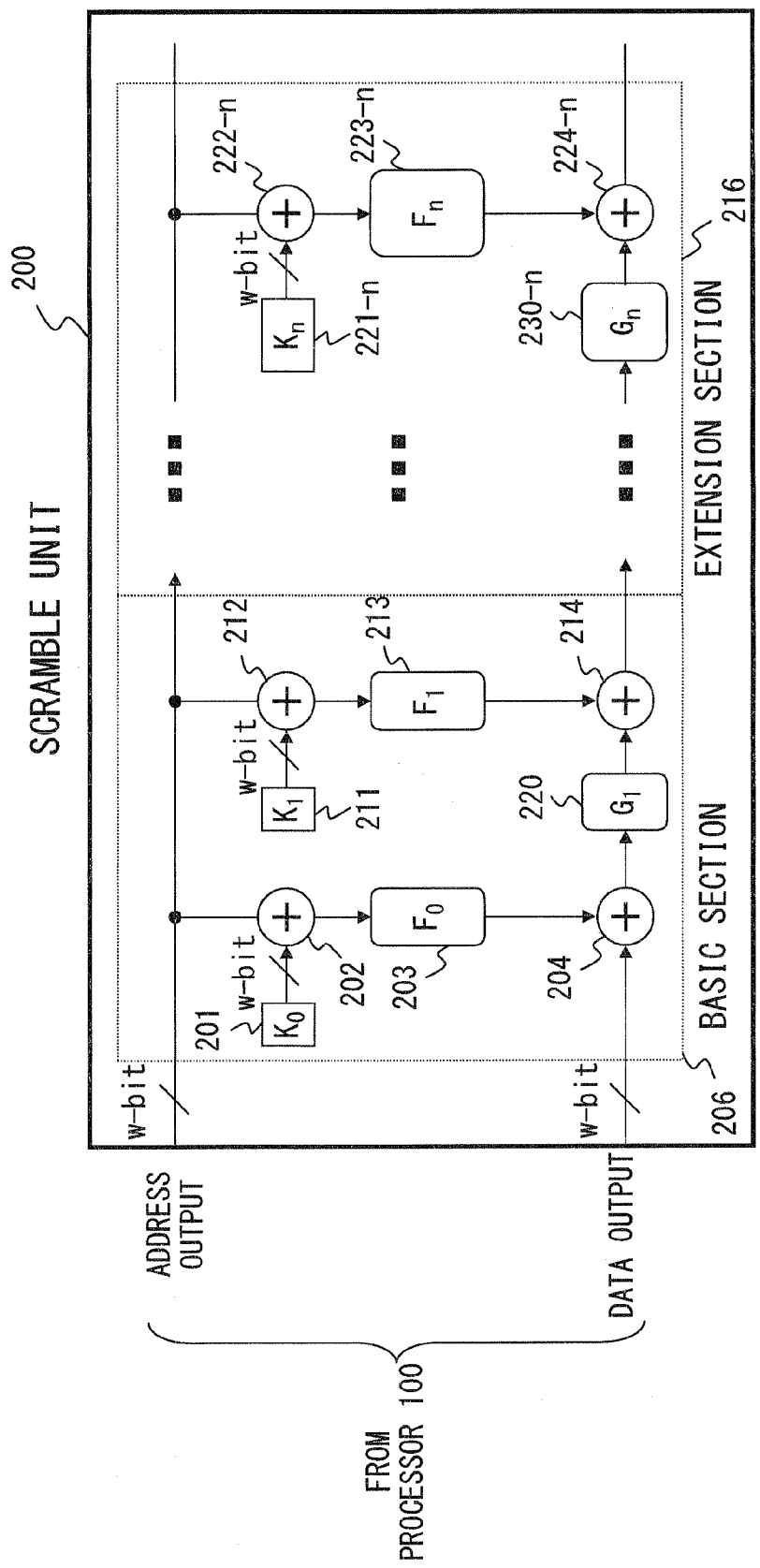
FIG. 9 is diagram illustrating a fifth example of a scramble unit presented in FIG. 2.

Next, FIG. 9 is described. FIG. 9 illustrates the fifth example of the configuration of the scramble unit 200 presented in FIG. 2. The fifth example is the one in which the number of connection in tandem of the extension section in the fourth example presented in FIG. 8 is extended to n stages.

In FIG. 9, the scramble unit 200 has the basic section 206 and an extension section 216 having n (here, n is an integer at least equal to or above 1) units of extension scramble units that scramble target data and output scrambled data.

Here, the n-th extension scramble unit is configured to have a key register 221-$n$, the XOR circuits 222-$n$ and 224-$n$, and substitution function processing units 223-$n$ and 230-$n$. Here, the substitution function processing unit 230-$n$ performs one-to-one substitution conversion of target data to be the target of scrambling in the n-th scramble unit. Meanwhile, the key register 221-$n$, the XOR circuit 222-$n$, and the substitution function processing unit 223-$n$ obtain mask data (additional mask data) corresponding to the address data output by the processor 100. Then, the XOR circuit 224-$n$ scrambles the data after the substitution conversion of the target data by the substitution function processing unit 230-$n$ by XORing it and the additional mask data for each bit and outputs scrambled data (additional scrambled data). Meanwhile, the target data at this time is additional scrambled data output by the (n−1)th extension scramble unit (however, scramble data output by the basic unit when n=1).

The scramble unit 200 in FIG. 9 is configured as described above, and outputs the additional scrambled data obtained by the n-th extension scramble unit from the data bus 12 to the external RAM 2 as confidential data.

As described above, the configuration of the scramble unit 200 presented in FIG. 9 in the one in which, in the second configuration presented in FIG. 4, the extension scramble unit following the basic section is connected in tandem in n stages. Therefore, in order to obtain original data by descrambling confidential data obtained by the configuration, descrambling for the extension scramble unit may be performed in inverse order n times, and descrambling for the basic section may be performed after that.

In the scramble unit 200 presented in FIG. 9, scrambling of write-in data is performed using n+2 scramble key data stored in n+2 key registers 201, 211, 221-1, . . . , 221-$n$. Therefore, in the scramble unit 200 as a whole, the key length of the scramble key data used for the scrambling of write-in data becomes (n+2) times ((n+2)*w-bit). Therefore, by adopting the configuration in FIG. 9, the resistance to the brute force key attack further improved compared with the configuration in FIG. 4.

Meanwhile, in the configuration in FIG. 9, within the range of the allowable security, the substitution conversion processing units 230-$n$ may be reduced to less than n units in order for a faster speed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could made hereto without departing from the spirit and scope of the invention.

What is claimed is:

1. A data processing apparatus, comprising:
   an address bus which outputs address data to be given to a memory apparatus;
   a scramble unit which scrambles write-in data as confidential data, the write-in data being to be stored into a storage position in the memory apparatus after scrambling, the storage position being identified by the address data output by the address bus, the scramble unit comprising:
  a first scrambler which scrambles the write-in data by XORing the write-in data and first mask data generated by using an address data which is the same as the address data output by the address bus for each bit to obtain first scrambled data,
  a first converter which performs one-to-one substitution conversion of the first scrambled data, and
  a second scrambler which scrambles the first scrambled data after conversion by the first converter by XORing the first scrambled data after conversion and second mask data generated by using an address data which is the same as the address data output by the address bus for each bit to obtain second scrambled data; and
  a data bus which outputs the second scrambled data obtained by the second scrambler of the scramble unit as the scrambled write-in data to the memory apparatus.

2. The data processing apparatus according to claim 1, wherein
  the first scrambler obtains the first mask data by performing substitution conversion of XOR of the address data and first scramble key data for each bit, and
  the second scrambler obtains the second mask data by performing substitution conversion of XOR of the address data and second scramble key data for each bit.

3. The data processing apparatus according to claim 1, further comprising:
  a first descrambler which descrambles the confidential data read out from a storage position in the memory apparatus identified by the address data by XORing with the second mask data for each bit to obtain intermediate descrambled data;
  an inverse converter which performs inverse conversion of substitution conversion by the first converter for the intermediate descrambled data; and
  a second descrambler which descramble data after inverse conversion of the intermediate descrambled data by the inverse converter by XORing with the first mask data for each bit to obtain the write-in data.

4. The data processing apparatus according to claim 3, further comprising:
  a first logic circuit which XORs input data and the first mask data for each bit; and
  a second logic circuit which XORs input data and the second mask data for each bit,
wherein
  the first logic circuit is shared for scrambling in the first scrambler and descrambling in the second descrambler, and
  the second logic circuit is shared for scrambling in the second scrambler and descrambling in the first descrambler.

5. The data processing apparatus according to claim 3, wherein
  an identical substitution conversion which performs one-to-one substitution conversion of input data and in which forward conversion and inverse conversion are identical is shared for substitution conversion in the first converter and inverse conversion in the inverse converter.

6. The data processing apparatus according to claim 1, wherein
  the scramble unit further comprises at least an extension scrambler configured to scramble target data, and the extension scrambler comprises:
  an additional converter which performs one-to-one substitution conversion of the target data; and
  an additional scrambler which scrambles data after conversion of the target data by the additional converter by XORing with additional mask data corresponding to the address for each bit to obtain additional scrambled data, and
  to the extension scrambler, the second scrambled data is input as target data, and
  the scramble unit makes additional scrambled data obtained by the extension scrambler instead of the second scrambled data.

7. A descramble apparatus configured to descramble confidential data obtained by a data processing apparatus which scrambles data, the data processing apparatus comprising:
  an address bus which outputs address data to be given to a memory apparatus;
  a scramble unit which scrambles a write-in data as confidential data, the write-in data being to be stored into a storage position in the memory apparatus after scrambling, the storage position being identified by the address data output by the address bus, the scramble unit comprising:
    a first scrambler which scrambles the write-in data by XORing the write-in data and first mask data generated by using an address data which is the same as the address data output by the address bus for each bit to obtain first scrambled data,
    a first converter which performs one-to-one substitution conversion of the first scrambled data, and
    a second scrambler which scrambles the first scrambled data after conversion by the first converter by XORing the first scrambled data after conversion and second mask data generated by using an address data which is the same as the address data output by the address bus for each bit to obtain second scrambled data; and
  a data bus which outputs the second scrambled data obtained by the second scrambler of the scramble unit as the scrambled write-in data to the memory apparatus,
  the descramble apparatus comprising:
  an address bus which outputs address data to be given to the memory apparatus;
  a first descrambler which descrambles the confidential data read out from a storage position in the memory apparatus identified by the address data by XORing with the second mask data for each bit to obtain intermediate descrambled data;
  an inverse converter which performs inverse conversion of substitution conversion by the first converter for the intermediate descrambled data; and
  a second descrambler which descrambles data after inverse conversion of the intermediate descrambled data by the inverse converter by XORing with the first mask data for each bit to obtain the write-in data.

8. A data processing method, comprising:
outputting address data to be given to a memory apparatus from an address bus;
scrambling write-in data as confidential data, the write-in data being to be stored into a storage position in the memory apparatus after scrambling, the storage position being identified by the address data output by the address bus, the scrambling the write-in data comprising:
  scrambling the write-in data by XORing the write-in data and first mask data generated by using an address data which is the same as the address data output by the address bus for each bit to obtain first scrambled data, performing one-to-one substitution conversion of the first scrambled data, and scrambling data after the substitution conversion of the first scrambled data by XORing the first scrambled data after conversion and second mask data generated by using an address data which is the same as the second address data output by the address bus to obtain second scrambled data; and outputting the second scrambled data as the scrambled write-in data from a data bus to the memory apparatus.

9. The data processing method according to claim 8, wherein the scrambling the write-in data to obtain first scrambled data obtains the first mask data by performing substitution conversion of XOR of the address data and first scramble key data for each bit, and the scrambling data after the substitution conversion of the first scrambled data obtains the second mask data by performing substitution conversion of XOR of the address data and second scramble key data for each bit.

10. The data processing method according to claim 8, further comprising:

descrambling the confidential data read out from a storage position in the memory apparatus identified by the address data by XORing with the second mask data for each bit to obtain intermediate scrambled data;

performing inverse conversion of the substitution conversion for the intermediate scrambled data; and descrambling data after the inverse conversion of the intermediate descrambled data by XORing with the first mask data for each bit to obtain the write-in data.

11. The data processing method according to claim 10, wherein a first logic circuit configured to XOR input data and the first mask data for each bit is shared for scrambling in the scrambling the write-in data to obtain first scrambled data and descrambling in the descrambling data after the inverse conversion of the intermediate descrambled data, and a second logic circuit configured to XOR input data and the second mask data for each bit is shared for scrambling in the scrambling data after the substitution conversion of the first scrambled data and descrambling in the descrambling the confidential data.

12. The data processing method according to claim 10, wherein a substitution function unit which performs one-to-one substitution conversion of input data and in which forward conversion and inverse conversion are identical is shared for the substitution conversion of the first scrambled data and the inverse conversion of the substitution conversion for the intermediate scrambled data.

13. The data processing method according to claim 8, wherein the scrambling the write-in data to obtain confidential data comprises scrambling target data comprising:

performing one-to-one substitution conversion of the target data; and scrambling data after the substitution conversion of the target data by XORing with additional mask data corresponding to the address for each bit to obtain additional scrambled data, and the scrambling the target data scrambles the second scrambled data as the target data, and the scrambling the write-in data makes the additional scrambled data obtained by the scrambling the target data the confidential data instead of the second scrambled data.

14. A descrambling method comprising:

descrambling confidential data obtained by using a data processing method which scrambles data, the data processing method comprising:

outputting address data to be given to a memory apparatus from an address bus;

scrambling write-in data as confidential data, the write-in data being to be stored into a storage position in the memory apparatus after scrambling, the storage position being identified by the address data output by the address bus, wherein the scrambling the write-in data comprises:

scrambling the write-in data by XORing the write-in data and first mask data generated by using an address data which is the same as the address data output by the address bus for each bit to obtain first scrambled data, performing one-to-one substitution conversion of the first scrambled data, and scrambling data after the substitution conversion of the first scrambled data by XORing the first scrambled data after conversion and second mask data generated by using an address data which is the same as the second address data output by the address bus to obtain second scrambled data; and outputting the second scrambled data as the scrambled write-in data from a data bus to the memory apparatus, wherein the descrambling confidential data comprises:

outputting address data to be given to the memory apparatus from an address bus;

descrambling the confidential data read out from a storage position in the memory apparatus identified by the address data by XORing with the second mask data for each bit to obtain intermediate descrambled data;

performing inverse conversion of the substitution conversion for the intermediate scrambled data; and descrambling data after the inverse conversion of the intermediate descrambled data by XORing with the first mask data for each bit to obtain the write-in data.

\* \* \* \* \*